Patented Dec. 22, 1925. 1,566,938
UNITED STATES PATENT OFFICE.
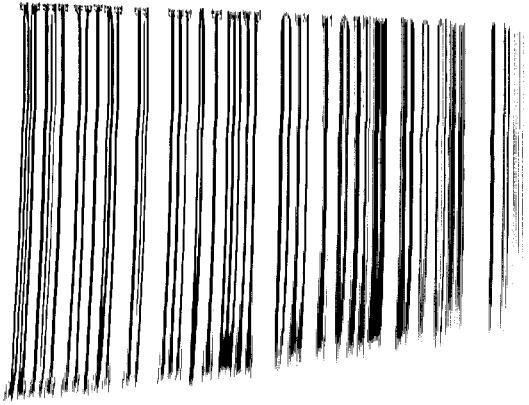
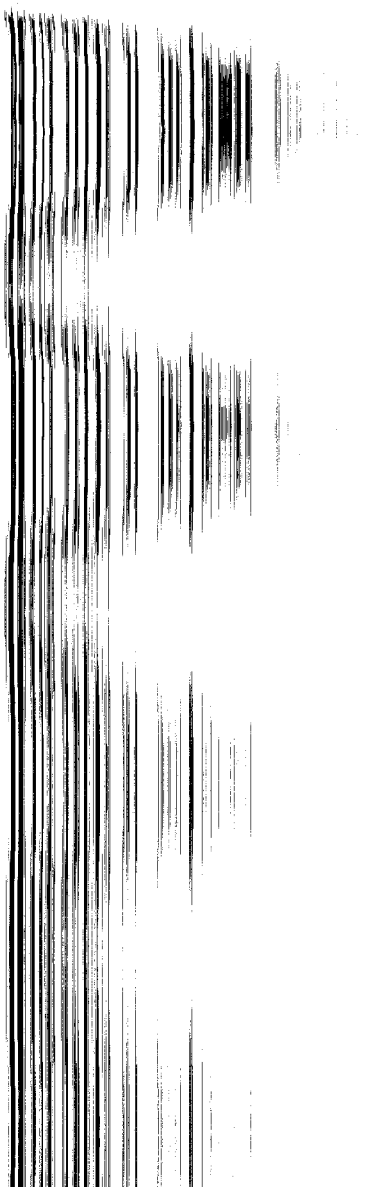

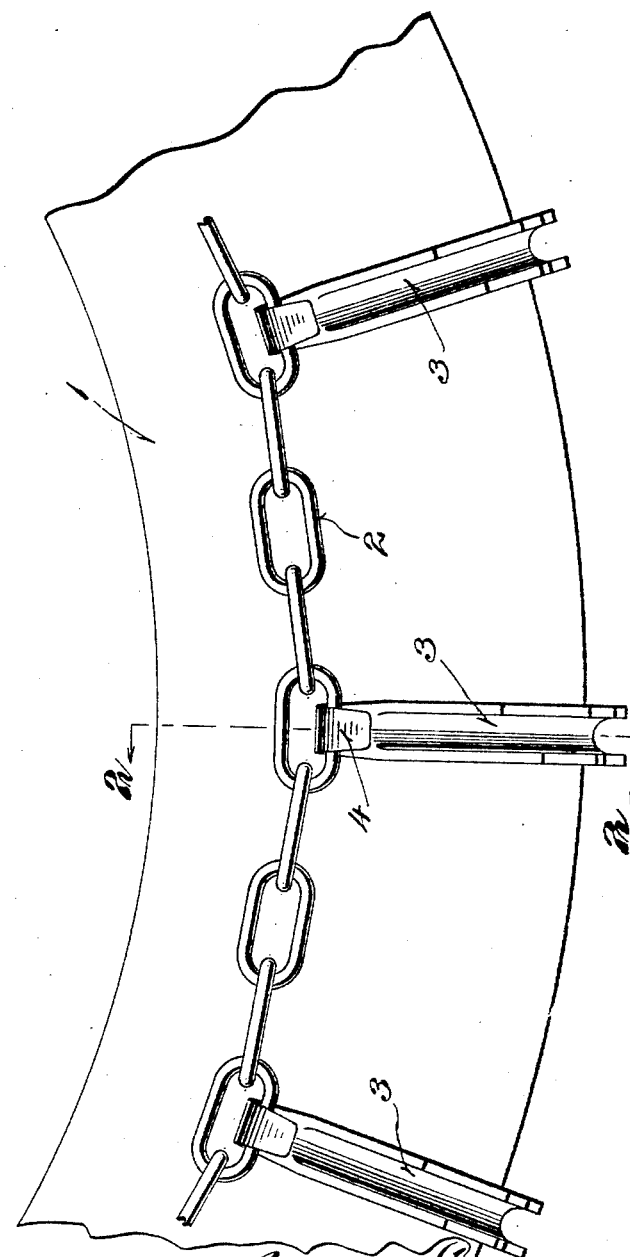

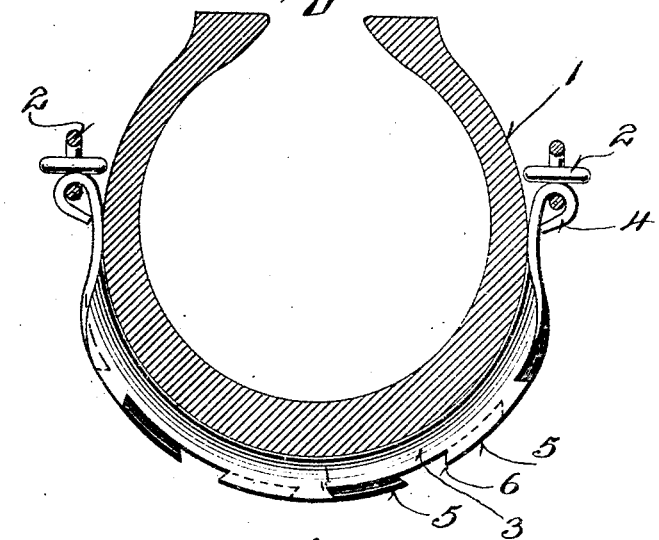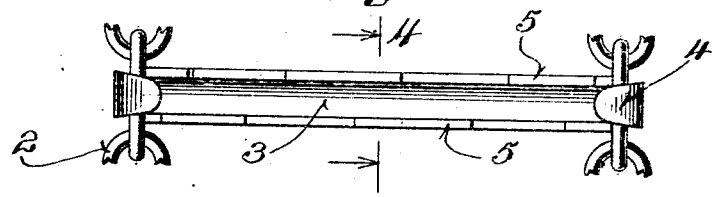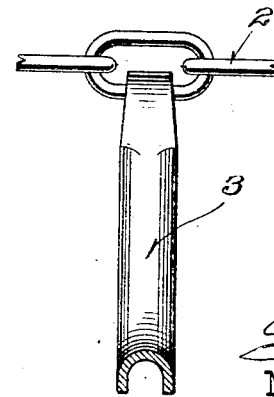

that the invention may be variously embodied and is, therefore, to be limited only as claimed.

We claim:

An anti-skid device for a tire comprising a pair of side chains forming continuous circles on opposite sides of the tire, a plurality of rigid members having a U-shaped cross section and conforming to said tire, said members having malleable hooks folded into removable interlocking engagement with said chains, said U-shaped members having opposed flanges extending transversely of said tire and having ears, with the ears of one flange staggered with respect to the ears of the other flange.

In testimony that we claim the foregoing we have hereunto set our hands at Lone Rock, in the county of Richland and State of Wisconsin, and at Avoca, in the county of Iowa, and State of Wisconsin, respectively.

MELVIN E. WALTY.
FRANK O. WALTY.